April 1, 1969        T. J. SHELLY        3,436,102

FITMENTS FOR FILAMENT WOUND VESSELS

Filed Sept. 23, 1966

INVENTOR.
THOMAS J. SHELLY
BY
*Staelin & Overman*
ATTORNEYS

INTEGRALLY MOLDED FLANGE AND CONICAL GUSSET

United States Patent Office 3,436,102
Patented Apr. 1, 1969

3,436,102
FITMENTS FOR FILAMENT WOUND VESSELS
Thomas J. Shelly, Granville, Ohio, assignor to Owens-Corning Fiberglas Corporation, a corporation of Delaware
Filed Sept. 23, 1966, Ser. No. 581,644
Int. Cl. F16c 13/04, 35/00, 55/00
U.S. Cl. 285—114                                14 Claims

ABSTRACT OF THE DISCLOSURE

Fitments of reinforced resin for filament wound vessel walls, including a truncated conical wall with the minor diameter at the top and forming a thickened integral pipe connecting flange and the major diameter at the bottom forming a radially outwardly extending flange for joining to the wall, and with a segment of pipe having one end in the top flange and the other end through a cut hole in the vessel wall, whereby stresses applied to the flange are absorbed over a substantial annular area of the vessel wall.

---

This invention relates to the application of fittings and nozzles to glass fiber reinforced vessels for improved structural performance and resistance to mechanical failure.

In its broader aspects, the invention encompasses the application of fittings and nozzles to storage vessels for both pressurized and nonpressurized fluids, including pipe lines, conduits and the like.

The problem

In order to make tanks and analogous fluid handling vessels of high strength, continuous glass filaments are wound over the convex surface of a winding mandrel. The winding is conducted in a spiral pattern. Continuous glass filaments are of very high tensile strength and when embedded in a hardened matrix resin to distribute the load between filaments, provide a very strong structure with low wall thickness.

It is important in the filament winding process that the continuous filaments (rovings) be laid onto the winding mandrel in properly oriented, spiral form, all along the length of the mandrel, and under constant and uniform tension. Instead of tension, it might be stated that the filaments are linearly oriented to substantially fully extended length in order to be rendered substantially instantaneously load-bearing when a load is applied to the composite construction. If this is not done, a nonuniform structure will be the result and strength defects are usually bound to appear during the use of the vessel.

A filament wound tank or vessel is designated to take advantage of the high tensile strength of the continuous glass filaments. As indicated above, winding geometries are used which cause all filaments to be stressed in pure tension as close as possible, leaving only secondary loads to be borne by the resin matrix. However, difficulties are created when, as is often necessary, openings, holes and ports must be incorporated into the vessel to accept fittings, nozzles and the like.

Where the continuous filaments are cut by a hole, the primary tension load is transferred into the resin matrix which, in turn, transfers the load to uncut filaments along the sides of the openings. The load transfer increases the shear stresses on the composite material, the stresses being greatest at the periphery of the hole along planes parallel to the filament paths. Because of its relatively low shear strength, the filament wound material cannot resist the shear loads and structural failure occurs along the major shear plane. This is illustrated schematically in FIGURE 1 of the drawings at the point marked "Cross Shear Failure."

The most logical solution, of course, to the problem would be to use filament and binder materials having high shear strength. However, such materials currently do not exist. The present invention, therefore, provides a novel solution to this problem.

Accordingly, it is an important object to provide filament wound vessels with openings and fitments, including fittings and nozzles for such openings, wherein structural failures along shear planes are overcome.

Another object is to provide a more economical fitment and method for formation, while overcoming structural failures along shear planes.

Other objects will appear in the following description and appended claims, reference being had to the accompanying drawings forming a part of this specification.

Figure 1:
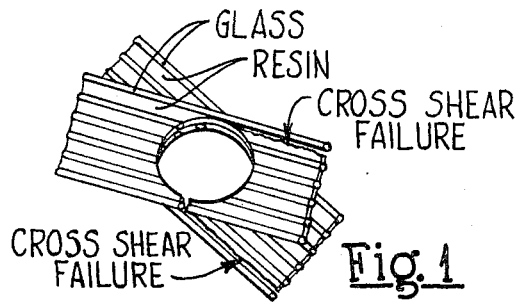
FIGURE 1 is a fragmentary perspective view of a portion of the wall of a glass fiber reinforced plastic vessel, including filament wound reinforcement filaments embedded in a hardened resin matrix, and illustrating an opening and cross-shear failure starting at the opening and extending outwardly therefrom, thus illustrating the problem solved by the present invention.

It is to be understood that the invention is not to be limited in scope to the particular details of construction shown in the drawings. Also, it is to be understood that the terminology employed is for the purpose of description and not of limitation.

Figure 2:
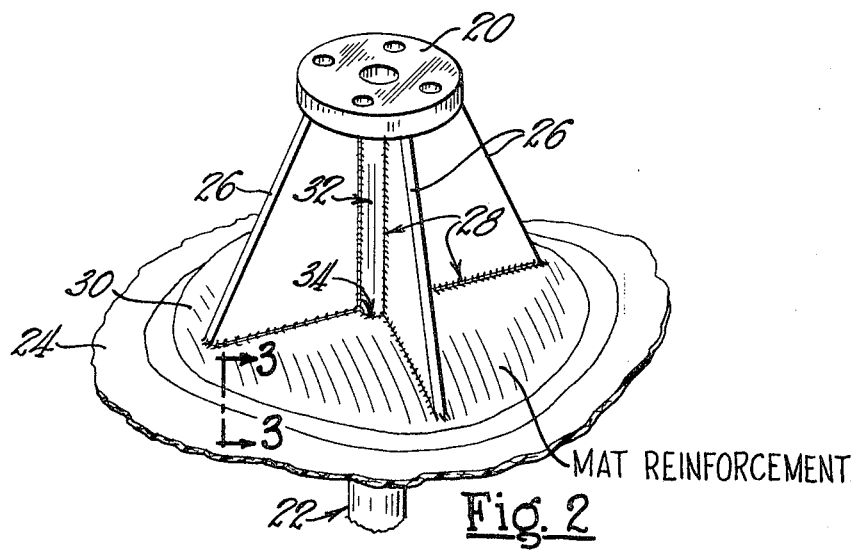
FIGURE 2 is a fragmentary perspective view showing a conventional method of construction in applying flanged fittings to a glass fiber reinforced vessel wherein repeated hand layup of reinforcement material about each supporting gusset requires a time-consuming, laborious and expensive operation.
Figure 3:
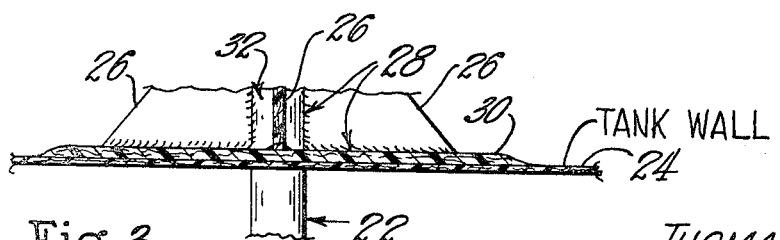
FIGURE 3 is a sectional view taken along the line 3—3 of FIGURE 2.

The prior conventional practice, FIGURES 2 and 3

A prior conventional fitment and method of fabrication are shown in these figures of the drawings. In this construction, a flanged fitting 20 is mounted on one end of a suitable length of pipe 22. It will be noted that the pipe 22 extends down through the vessel wall 24 to provide suitable connecting access to the inside of the vessel.

It will be noted that reinforcing gussets 26 are aligned with the axis of the pipe 22 and are spaced 90° from one another around the periphery of that portion 32 of the pipe which is exposed on the outside of the vessel, between the wall 24 and the flanged fitting 20. The showing of FIGURE 2 is purely exemplary and a greater or lesser number of gussets 26 can be employed if desired. A weld-type connection is indicated at 28 between the pipe 22 and the gussets 26. The gussets 26 are also joined to the bottom side of the flanged fitting 20, in the same manner, to support it in a rigid and strong fashion in order to absorb the stresses applied when a similar, connecting flanged fitting is applied for attachment of a connecting pipe, thereby joining the vessel of which the wall 24 is a part with another instrumentality, such as a vessel or pump or the like.

It will be understood that the gussets 26 transfer the stresses absorbed from the flanged fitting 20 into the tank wall 24. Therefore, the tank wall 24 must be reinforced and made more rigid in this area. Conventionally, therefore, the vessel wall 24 is built up in the area defined by the circle of reinforcement 30. This is done by repeated hand layup of several strips or layers of mat or glass cloth reinforcement material to provide an annular reinforcement mass 30. The reinforcement strips are overlapped up onto the lower portions of the gussets and also onto the lower portions of the exposed pipe section 32. This provides a weldment 28 between the gussets 26 and the reinforcement material 30 and a welded seal 34 between the exposed pipe section 32 and the vessel wall 24 as indicated in FIGURE 2.

It will be understood that repeated hand layup of the material about each supporting gusset is quite time-consuming and laborious and amounts to a very expensive fitting procedure. It will also be evident that stress distribution is not uniform between the flanged fitting 20 and the vessel wall 24. Instead, stress distribution is concentrated either singly or collectively at the bases of the gussets 26. The same applies to stress transfer between the flange fitting 20 and the gussets 26, at the upper ends of each of the gussets.

Figure 4:
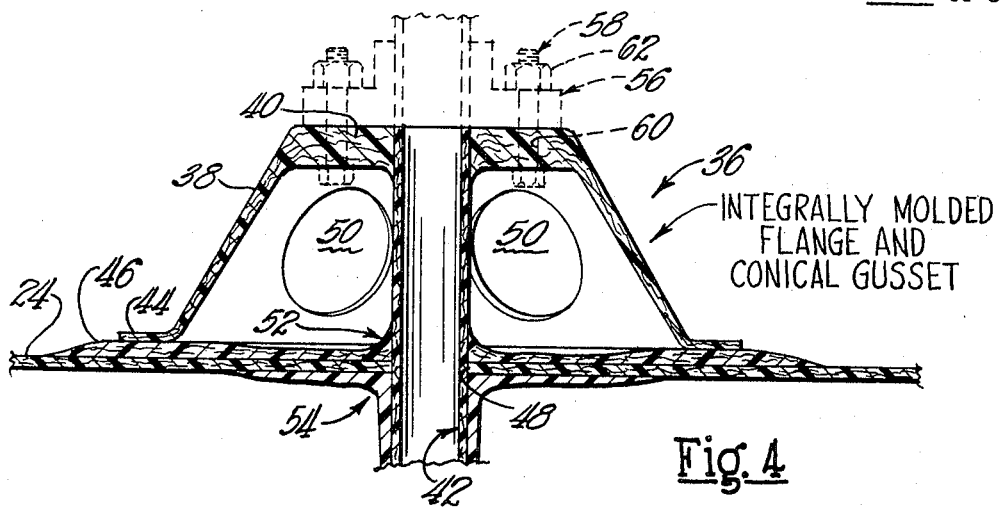
FIGURE 4 is an axial sectional view of a first and principal embodiment of the invention.
Figure 5:
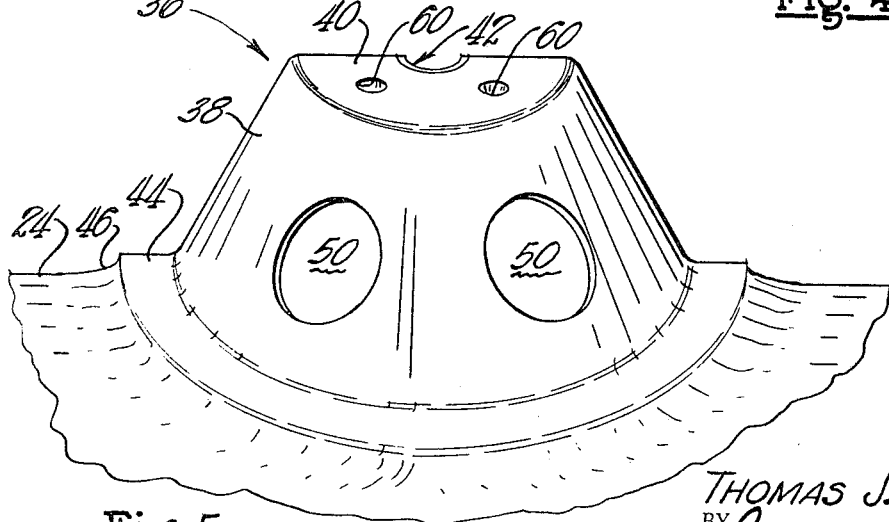
FIGURE 5 is a perspective view, taken from above and on the opposite side, viewing FIGURE 4, but without the phantom flanged fitting shown in FIGURE 4.

*The first and principal embodiment of the invention, FIGURES 4 and 5*

This is the ultimate design in accordance with the present invention and embodies the most efficient fabrication procedure now known. In this embodiment, an entire fitting assembly 36 is made in one piece. Thus, a truncated conical wall 38, a with a thick transverse connecting flange portion 40, and a preformed piece of pipe 42 are molded together as a single unit 36. The transverse connecting flange portion 40 is designed of such thickness to withstand connecting flange stresses. At the major diameter or base, the truncated conical wall 38 is also provided with an integrally formed, outwardly extending and radially oriented flange 44. The base flange 44 provides the means by which the unit 36 is secured to the vessel wall 24 and the base flange is, therefore, contoured to match the contour of the wall 24.

To provide attachment to the vessel wall 24, an annular reinforcement overlay 46 is built up on the outside of the vessel wall 24. This is done by laying up a plurality of annular layers of reinforcement mat or cloth saturated with liquid resin. As contrasted to the showing of FIGURES 2 and 3, however, there is no necessity of overlapping the reinforcing up onto the radial flange 44, as was required for the gusset welds 28 in FIGURES 2 and 3. Therefore, a greatly simplified installation becomes at once apparent.

Application assembly is effected by inserting the pipe 42 through the hole 48 in the vessel wall 24 and positioning the base flange 44 on the reinforcement annulus 46.

It is desirable that reinforcement material and resin be shaped up around the joint between the pipe 42 and the upper portion of the wall 24 surrounding the hole 48 through which the pipe is inserted.

This is done by working through access holes 50 provided in the truncated conical wall 38, to provide a radius weld 52 which assures a seal between the pipe 42 and the vessel wall 24.

On the inside of the wall 24, a workmanlike weld 54 is also provided by means of reinforcement material and liquid resin.

Essentially then, in accordance with the invention, nothing more is required than conventionally reinforcing around the hole 48 and the pipe 42 and setting the unit 36 in place and thereafter curing the resin of the welds 52 and 54 and the resin which welds the radial flange 44 to the annular reinforcement overlay 46 which secures the unit to the vessel wall 24. The unitary fitting assembly 36, including the truncated conical wall 38, connecting flange portion 40 and the pipe 42, eliminates all fabrication steps except sealing the joint where the pipe 42 enters the tank wall 24 and sealing at the locus where the flange 44 joins the outer surface of the vessel wall.

It is by means of connecting flange portion 40 that a flanged fitting 56 is secured to the unit 36 to provide operating access between the inside of a vessel of which the wall 24 is a part and another instrumentality such as another vessel. This is effected by bolts 58 which are passed through the access hole 50 and inserted through bolt holes 60 in the connecting flange portion 40. The nuts 62 are applied to the bolts 58 and tightened at the exposed top surface.

It is to be noted that a substantial advancement, not only in fabrication but also in stress distribution, is provided. Thus, the base flange 44 provides extremely good and broad stress distribution all around the fitting assembly 36 and around the hole 48 through which the pipe 42 is connected into the interior of the vessel wall 24. Any stress applied to the thick, transverse connecting flange portion 40 is uniformly distributed over a substantial area of the vessel wall 24 surrounding the hole 48 through which the pipe 42 is passed in sealed relationship.

Figure 4A:
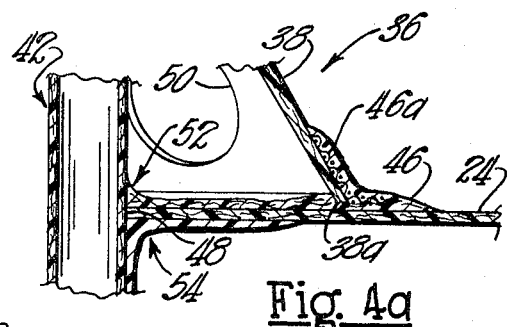
FIGURE 4a is a fragmentary sectional view of a modification of the first and principal embodiment.

In FIGURE 4a there is shown an important aspect of the invention wherein uniform stress distribution is provided, but without the base flange 44 shown in FIGURE 4. In this aspect, the truncated conical wall 38 is simply terminated at the major diameter or base end 38a. By so operating, the base diameter 38a can be dressed by a suitable abrasive tool to the contour of the wall 24 surrounding the hole 48. Then, the dressed base 38a is embedded in the annular reinforcement overlay 46 for joinder to the wall 24.

It is to be noted that overlay 46 is continuous from pipe 42 to slightly beyond the base 38a of wall 38. The base edge 38a is embedded to about one-half the depth of overlay 46. A resin saturated mat 46a is overlaid on the outside of this joint and becomes an integral part of the joint when the resin is cured.

This makes it possible to produce a single wall 38 for substantially any contour of the wall 24. In FIGURE 4, by comparison, the base flange 44 must be molded to the contour of the wall 24. Accordingly, the modification of FIGURE 4a reflects improved versatility of invention by the fact that a single shape of wall 38 can be used for either flat or curved wall contours, by a simple custom dressing operation. A custom flange molding operation would be required for the embodiment of FIGURE 4, for each different contour of wall 24. The embodiment of FIGURE 4a, therefore, provides an improvement in economy.

Figure 7:
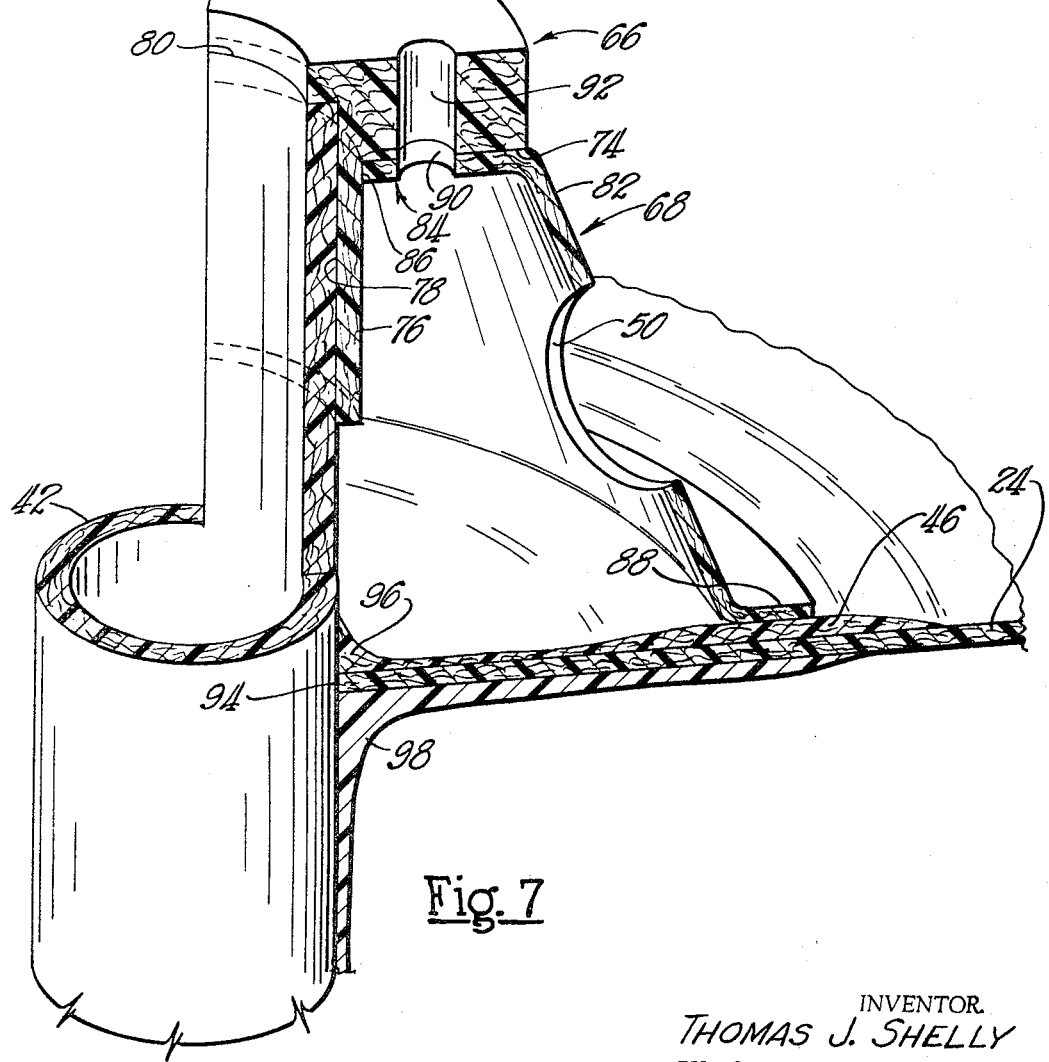

The principles of FIGURE 4a are also applicable to FIGURE 7, discussed below.

Figure 6:
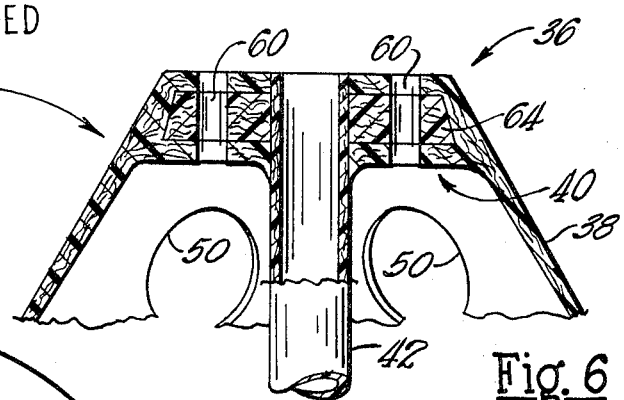
FIGURE 6 is a fragmentary sectional view, showing a refined aspect of the embodiment of FIGURES 4 and 5; and, FIGURE 7 is an axial sectional view of a second and secondary embodiment of the invention.

*A further aspect of the first embodiment, FIGURE 6*

Relative to the heavy section comprising the connecting flange portion 40, shown in FIGURE 4, it will be understood that a large mass of bonding resin is present in this section. It has been found from experience that a very slow curing cycle is required in order to dissipate the heat of polymerization, e.g., control the exotherm of polymerization that is produced by the mass action effect of the polymerizing resin mass in this area. In accordance with the present aspect of this invention, the resin exotherm has been eliminated and the production rate has been substantially speeded.

Accordingly, as shown in FIGURE 6, a core of filler material 64 has been inserted into the central portion of the heavy connecting flange portion 40. This material is suitably a pressed fibrous material, bonded together by a thermosetic phenolic resin, and thus having a relatively high density and relatively high strength. Masonite, trademark, a dense, fibrous board-like material, bonded with phenolic resin has been used with very good results. This provides a very rapid one-step forming operation without excess exotherm and, accordingly, provides a further and substantial advancement to the art.

Within the scope of the invention, the filler material 64 can comprise a piece made of preformed resin, of the nature of the matrix material used otherwise in the heavy connecting flange portion 40. In this aspect of the invention, it will be evident that a broad range of filler materials can be employed and those mentioned are for the purpose of explanation and not limitation. The important point is that at any given point in the heavy connecting flange area 44, the thickness of resin is reduced so as to prevent an undue resin curing exotherm during the manufacture of the fitting assembly 36.

*The second embodiment of the invention*

In this embodiment a preformed fitting 66 is utilized in the nature of the unit 20 in FIGURES 2 and 3. However, refined improvement is evident by the use of the fitting with a suitable length of preformed pipe 42 and a separately formed, truncated conical wall unit 68. The fitting 66, pipe 42 and truncated conical wall unit 68 are assembled by being cemented together, to provide a completed fitting installation. This construction provides the improved stress distribution all around the fitting, but involves the cost of the separately formed flanged fitting and the hand steps of assemblying the units together. Nonetheless, it is within the scope of the invention and provides a definite improvement to the art and, accordingly, a full and complete description is provided hereafter.

The preformed flanged fitting 66 is suitably made of reinforced thermosetting resin such as phenolic or epoxy. The fitting 66 includes a thick radial portion 70 that is flat on the top 72 to receive a similar fitting in flat engagement to provide a connection to another vessel. From the bottom surface 74 of the thick radial portion 70, there extends a tubular portion 76. A counterbore 78 terminates in a shoulder 80, and the pipe 42 is inserted into the counterbore against the shoulder and is cemented in place.

The separate truncated conical wall unit 68 is used to support the fitting 66, with the pipe 42. The truncated conical wall unit 68 includes the basic truncated conical wall portion 82 which has an integrally formed radially inwardly extending flange 84 at the top. Flange 84 is of thinner section than the flange portion 40 shown in the embodiment of FIGURES 4 and 5, and is of annular configuration, having a central hole 86 to receive the tubular extension 76 of the fitting 66. At the major diameter or base of the truncated conical wall portion 82, there is provided an integrally formed, outwardly extending and radially oriented flange 88.

The upper flange 84 provides the means for supporting the preformed fitting 66. Thus, the bottom surface 74 of the thick radial portion 70 of the fitting 66 fits upon the upper surface of the flange 84 and is cemented in place to provide assembly. A bolt hole 90 is extended through the radial flange 84 to coincide with an analogous hole 92 of the fitting 66. An access hole 50 is provided in appropriate relationship to the bolt hole 90. By this procedure, a connecting flange of the nature shown in FIGURE 4 can be bolted in place.

The base flange 88 provides the means by which the truncated conical wall unit 68 is secured to the vessel wall 24 and the base flange 88 is, therefore, contoured to match the contour of the wall 24, around hole 94.

To provide attachment to the wall 24, an annulus of reinforcement material 46 is overlaid on the outer surface of the wall, as for the embodiment of FIGURES 4, 4a and 5. This surrounds the hole 94, through which the pipe 42 is inserted.

Application assembly is provided by inserting the pipe 42 and the tubular extension 76 through the hole 86 of the upper flange 84 of the conical wall unit 68. Then, the lower end of the pipe 42 is inserted through the hole 94 in the wall 24 and the base flange 88 is positioned on the reinforcement annulus 46. Reinforcement material is shaped around the joint at 96, between the pipe 42 and the upper side of that portion of the wall 24 surrounding the hole 94. This produces a radiused weld 96 and provides a seal between the pipe 42 and the vessel wall 24.

At the inside, a workmanlike radius welded 98 is also provided by means of reinforcement material and liquid resin.

Essentially then, in accordance with this aspect of the invention, nothing more is required than conventionally reinforcing as at 46 around the hole 94, inserting the pipe 42 and fitting 66 through the hole 86 of the truncated conical wall unit 68 and cementing, and then inserting the lower end of the pipe through the hole 94 and setting the flange 88 in position. Thereafter, the resin of the welds 96 and 98 and the resin which welds the radial flange 88 to the annular reinforcement overlay 46 is cured.

It will be evident that fabrication is substantially simplified, compared to the tedious layup joinder disclosed for FIGURES 2 and 3. It will further be evident that a substantial advancement to the art, not only in fabrication but also in stress distribution, is provided in the nature of that described relative to the embodiment of FIGURES 4, 4a, 5 and 6. Thus, any stress applied to the fitting 66 is uniformly distributed over a substantial area of the vessel wall 24 surrounding the hole 94 through which the pipe 42 is passed in sealed relationship.

I claim:
1. In a fitment for a filament wound vessel wall comprising continuous filament wound reinforcement and a bonding matrix therefor, wherein the filament windings are cut by an opening causing primary tension loading to be transferred into the matrix and thence to uncut filaments along the sides of the opening,
  a non-metallic tubular wall having an annular base end, the opening in said base end being substantially larger than the opening in said vessel wall,
  resin saturated mat means securing said base end to said vessel wall in surrounding relationship to said opening,
  said tubular wall having a top and with a thickened transverse flange of sufficient thickness to withstand flange connection stresses,
  a segment of pipe having ends, and extending axially of said tubular wall and being joined integrally at one end with said top transverse flange and extending therethrough to provide an opening,
  said pipe also extending through said cut opening of said vessel wall,
  and resin adhesive seal means securing said pipe in said opening of said vessel wall,
  whereby stress applied to said top transverse flange is absorbed by said tubular wall and is thence distributed over a substantial annular area of the vessel wall surrounding said cut opening through which said pipe is passed in sealed relationship.

2. The invention according to claim 1 wherein said continuous wall is of truncated conical configuration and with the major diameter comprising the base end and with the minor diameter comprising the top and with said thickened top flange extending radially inwardly for integral joinder with the top end of said pipe segment.

3. The invention according to claim 2 wherein said base end includes an integrally formed, radially extending flange, and the flange is shaped to the contour of the vessel wall surrounding the cut opening,
  and wherein said means securing said base flange to said vessel wall comprises an annular mass of reinforcement material and matrix.

4. The invention according to claim 2 wherein said fitment is made of filament reinforced matrix resin and wherein said thickened transverse top flange comprises an annular core of filler material in the central sectional portion and covered with filament reinforced matrix material providing integral joinder to the remainder of the fitment.

5. The invention according to claim 4 wherein the filler material comprises a dense, fibrous, board-like material, bonded with phenolic resin.

6. In a fitment for a reinforced resin wall having an opening therein,
   a truncated conical wall of reinforced resin having a base end at the major diameter and a top end at the minor diameter, an integrally formed radially outwardly extending annular flange at the base end having a diameter substantially larger than said opening and being adapted to be adhesively secured to said reinforced resin wall, an integrally formed thickened transverse annular flange at the top extending radially inwardly, said base and top flanges being of reinforced resin and formed as one piece with said wall, and said top flange being of sufficient thickness to withstand flange connection stresses,
   and a segment of pipe having ends and extending axially of said conical wall and being joined at one end with said top transverse flange and extending therethrough to provide an opening.

7. The invention according to claim 6 wherein said fitment is made of filament reinforced matrix resin and said thickened transverse top flange comprises an annular core of filler material in the central sectional portion and being covered with filament reinforced matrix material providing integral joinder to the remainder of the fitment.

8. In a fitment for a filament wound vessel comprising filament wound reinforcement and bonding matrix, wherein the continuous filament windings are cut by an opening whereby primary tension loading is transferred into the matrix and thence to uncut filaments along the sides of the opening,
   a non-metallic tubular wall having an annular base end, the opening in said base end being substantially larger than the opening, in said vessel wall,
   resin saturated mat means securing said base end to said vessel wall in surrounding relationship to said opening,
   said tubular wall having a top and with a transverse, annular flange formed integrally with the top,
   a preformed fitting of annular configuration, including a radial flange sealed coaxially to the top of said top flange, having a portion within said top flange of said tubular wall,
   a segment of pipe having ends, and with one end positioned within said preformed fitting and sealed thereto and said pipe extending axially of said tubular wall,
   said pipe extending through said cut opening of said vessel wall,
   and resin adhesive seal means securing said pipe in said cut opening of said vessel wall,
   whereby stresses applied to the preformed fitting are absorbed by said tubular wall, and are thence distributed over a substantial annular area of the vessel wall surrounding said cut opening through which said pipe is passed in sealed relationship.

9. The invention according to claim 8 wherein said continuous wall is of truncated conical configuration and with the major diameter comprising the base end and with the minor diameter comprising the top and with the top flange extending radially inwardly for sealed joinder with the bottom surface of said fitting, which receives said pipe segment.

10. The invention according to claim 9 wherein said base end includes an integrally formed, radial flange, and the flange is shaped to the contour of the vessel wall surrounding the cut opening,
    and wherein said means securing said base flange to said vessel wall comprises an annular mass of reinforcement material and matrix.

11. In a fitment,
    a tubular wall having a base end,
    said tubular wall having a top and with a transverse, inwardly extending relatively thin annular flange formed integrally with the top,
    a preformed fitting of annular configuration, including a relatively thick radial flange adhesively sealed coaxially to the top of said top flange and having a tubular portion telescoped axially within said top flange and extended a substantial distance into said tubular wall,
    a segment of pipe having ends, and with one end telescoped within said preformed fitting and adhesively sealed thereto, and said pipe being oriented axially of said tubular wall and having the other end extended out through said base end, said pipe having a substantially constant outer diameter and being substantially equal to the inner diameter of the tubular portion of said preformed fitting.

12. The invention according to claim 11 wherein said tubular wall is of truncated conical configuration and the major diameter comprising the base end and with the minor diameter comprising the top, and wherein said pipe extends coaxially of said tubular wall.

13. The invention according to claim 12 wherein said base end includes an integrally formed, radially outwardly extending annular flange.

14. The invention according to claim 12 wherein said conical wall is made of filament reinforced matrix resin.

References Cited

UNITED STATES PATENTS

| | | | |
|---|---|---|---|
| 1,756,668 | 4/1930 | Sprankle | 285—192 X |
| 1,883,086 | 10/1932 | Swartz | 285—423 X |
| 2,114,811 | 4/1938 | Reid | 285—192 X |
| 2,456,195 | 12/1948 | Jackson | 285—192 X |
| 2,656,925 | 10/1953 | Johnson | 285—192 X |
| 2,998,986 | 9/1961 | Buono | 285—229 |
| 3,106,940 | 10/1963 | Young | 285—189 X |

CARL W. TOMLIN, *Primary Examiner.*

THOMAS F. CALLAGHAN, *Assistant Examiner.*

U.S. Cl. X.R.

285—21, 158, 423